US012603238B2

(12) United States Patent
Cho

(10) Patent No.: US 12,603,238 B2
(45) Date of Patent: Apr. 14, 2026

(54) ELECTRONIC DEVICE AND ELECTRONIC TIMEPIECE

(71) Applicant: CASIO COMPUTER CO., LTD., Tokyo (JP)

(72) Inventor: Shinya Cho, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 295 days.

(21) Appl. No.: 18/457,798

(22) Filed: Aug. 29, 2023

(65) Prior Publication Data

US 2024/0071696 A1 Feb. 29, 2024

(30) Foreign Application Priority Data

Aug. 30, 2022 (JP) ................................ 2022-136406

(51) Int. Cl.
*H01H 13/20* (2006.01)
*G04G 17/02* (2006.01)
(Continued)

(52) U.S. Cl.
CPC ............ *H01H 13/20* (2013.01); *G04G 17/02* (2013.01); *G04G 21/08* (2013.01); *H01H 13/14* (2013.01)

(58) Field of Classification Search
CPC .. H01H 13/20; H01H 13/14; H01H 2225/028; H01H 1/26; H01H 13/26;
(Continued)

(56) References Cited

U.S. PATENT DOCUMENTS 4,272,841 A * 6/1981 Nickles .................. G04C 3/001 968/447
4,370,533 A * 1/1983 Kamei ............... H01H 11/0056 200/534

(Continued)

FOREIGN PATENT DOCUMENTS

| | | | |
|---|---|---|---|
| EP | 0016550 | B1 | 5/1983 |
| JP | 2018004559 | A | 1/2018 |
| JP | 2020098177 | A | 6/2020 |

OTHER PUBLICATIONS

Notice of Reasons for Refusal dated Jul. 23, 2024 received in Japanese Patent Application No. JP 2022-136406.

(Continued)

*Primary Examiner* — Edwin A. Leon
(74) *Attorney, Agent, or Firm* — Scully, Scott, Murphy & Presser, P.C.

(57) ABSTRACT

An electronic device includes a first plate spring, a second plate spring and a substrate. The first plate spring extends in a first direction from a fixed end. The second plate spring branches off from the first plate spring and extends in the first direction beyond a tip of the first plate spring in the first direction. The substrate has an electrode that contacts the second plate spring accompanied by the first plate spring being pushed by a pushbutton switch being pushed. The substrate does not contact the first plate spring. The second plate spring has a tip part. In a plan view in a push direction of the switch, the tip part extends, at a point beyond the tip of the first plate spring, in a second direction different from the first direction to overlap the substrate. The tip part contacts the electrode by the switch being pushed.

20 Claims, 3 Drawing Sheets

(51) Int. Cl.
*G04G 21/08* (2010.01)
*H01H 13/14* (2006.01)

(58) Field of Classification Search
CPC ........ G04G 17/02; G04G 21/08; G04C 3/008; G04C 3/001
See application file for complete search history.

(56) References Cited

U.S. PATENT DOCUMENTS 10,768,577 B2 * 9/2020 Lagorgette ........... H01H 15/102
11,016,447 B2 * 5/2021 Zanesco ................. G04G 21/00

OTHER PUBLICATIONS

Extended European Search Report dated Jan. 31, 2024 received in European Patent Application No. EP 23191830.1.
Notice of Reasons for Refusal dated Dec. 3, 2024 received in Japanese Patent Application No. JP 2022-136406.

* cited by examiner

ELECTRONIC DEVICE AND ELECTRONIC TIMEPIECE

REFERENCE TO RELATED APPLICATIONS

This application is based upon and claims the benefit of priority from the prior Japanese Patent Application No. 2022-136406, filed on Aug. 30, 2022, the entire contents of which are incorporated herein by reference.

TECHNICAL FIELD

The present disclosure relates to an electronic device and an electronic timepiece.

DESCRIPTION OF RELATED ART

In JP 2018-4559 A, there is disclosed an electronic timepiece in which the shaft of a pushbutton switch pushes and deforms a conductive plate spring when the pushbutton switch is pushed.

SUMMARY OF THE INVENTION

According to an aspect of the present disclosure, there is provided an electronic device, including:

a first plate spring extending in a first direction from a fixed end;

a second plate spring branching off from the first plate spring and extending in the first direction beyond a tip of the first plate spring in the first direction; and a substrate having an electrode that contacts the second plate spring accompanied by the first plate spring being pushed by a pushbutton switch being pushed, the substrate not contacting the first plate spring by the pushbutton switch being pushed, wherein the second plate spring has a tip part that in a plan view in a push direction in which the pushbutton switch is pushed, extends, at a point beyond the tip of the first plate spring in the first direction, in a second direction different from the first direction to overlap the substrate, and wherein the tip part contacts the electrode by the pushbutton switch being pushed.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments will be described with reference to the drawings.

Figure 1:
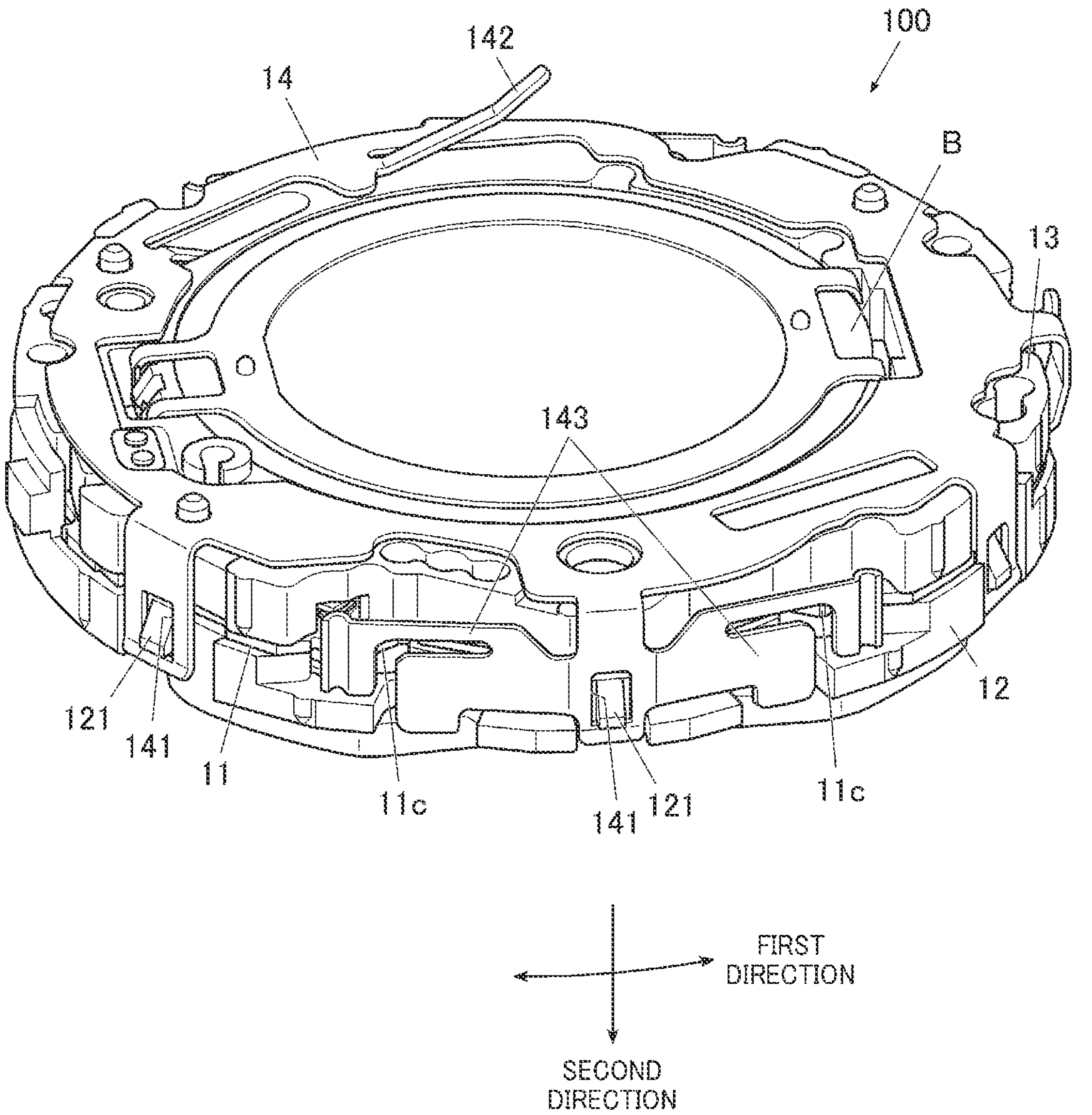
FIG. 1 is a perspective view of a module as an electronic device of an embodiment(s) viewed from the back side, the module being housed inside a case.

FIG. 1 is a perspective view of a module 100 as an electronic device of an embodiment(s) viewed from the back side. The module 100 is housed inside a case.

The electronic device (module 100) is, for example, a module that controls a wristwatch as an example of electronic timepieces. The module 100 is housed inside a cylindrical case and/or exterior member (which are collectively referred to as "case"), and the upper side (upper end) where a display screen is exposed and the lower side (back side, lower end) that contacts an arm/wrist are covered and sealed with a transparent crystal and a back cover, respectively. Although not particularly limited, the back cover may be a conductive member and constitute a part of a case ground plane. The module 100 includes a substrate 11, a first housing 12 (support member), a second housing 13 (support member) and a pressing member 14.

Conventionally, a plate spring contacts an electrode on a substrate by the plate spring deformed by a pushbutton switch being pushed, thereby being electrically connected to the electrode, and a push operation on the pushbutton switch is detected.

However, such a pushbutton switch could be pushed suddenly and unintentionally, for example, by an impact generated when an electronic timepiece or the like that includes an electronic device having the pushbutton switch falls. Depending on the degree of the impact transmitted to the inside, the electronic timepiece or the like may suffer damage to its internal structure or have trouble operating. Although the plate spring lessens such an impact, it is, if not impossible, hard to lengthen the plate spring unlimitedly.

Hereinafter, in order to improve such a situation, an electronic device and an electronic timepiece having high impact resistance and also how they reduce impacts will be described.

The substrate 11 is a plate-like member having electronic components for performing various types of operation (actions) of the electronic timepiece and electronic circuits (including electrodes) that connects the electronic components to one another. The electronic components may include, for example, a microcontroller, an external storage (flash memory, etc.), a large-capacitance capacitor, modules for various functional actions, such as communication and measurement, and a quartz oscillator. The substrate 11 receives power supplied from a battery B, and the electronic components and so forth operate by the power. For example, a microcontroller measures time (which may include date information) using a clock signal(s) corresponding to oscillation of a quartz oscillator. The microcontroller also causes the display screen disposed under the crystal to display time and so forth. The substrate 11 may be a multi-layer substrate having multiple layers. On the lateral surface of the substrate 11, electrodes 11*c* are disposed to be exposed.

The first housing 12 is disposed on the upper side of the substrate 11, and houses the display screen and, among the electronic components, those that are externally attached to and disposed on the upper side of the substrate 11. The externally attached electronic components may include, for example, a module for communication (which may be for reception only) and a large-capacitance capacitor.

The second housing 13 is disposed on the lower side of the substrate 11, so that the substrate 11 is interposed between the second housing 13 and the first housing 12. The second housing 13 houses the battery B at substantially the center. One side (e.g., lower side) of the battery B is connected to a case ground plane, and output (voltage, current) from the other side (upper side) is supplied to the substrate 11.

The pressing member 14 is a conductive member, in this embodiment, a metallic member, and has an annular part disposed along the lower side of the second housing 13. Parts of the pressing member 14 extend from the annular part to the lateral surface of the module 100, and openings 141 (fixed ends) provided therein are engaged with and fixed to claws 121 of the first housing 12. The parts include plate springs 143 described later. Thus, the pressing member 14 collectively holds the substrate 11, the first housing 12 and the second housing 13 such that the substrate 11 is interposed between the first housing 12 and the second housing 13.

The pressing member 14 is connected to the lower side of the battery B to be case-grounded (i.e., to be connected to the case ground plane). The pressing member 14 has a plate spring 142 that extends downward in its initial state. The plate spring 142 contacts the back cover, which makes the back cover a part of the case ground plane (ground potential).

Each plate spring 143 extends from an opening 141, which is provided in the lateral surface of the module 100, to both sides in the circumferential direction (first direction), which is along the lateral surface. The plate spring 143 is for detecting that a not-shown pushbutton switch (operation member) is pushed (down). The pushbutton switch is disposed on the lateral surface of the electronic timepiece, passing through the case. Its root part, shaft, is in contact with the plate spring 143 at least in a state in which the pushbutton switch is pushed. The shaft may not be in contact with the plate spring 143 in a state in which the pushbutton switch is not pushed.

Figure 2:
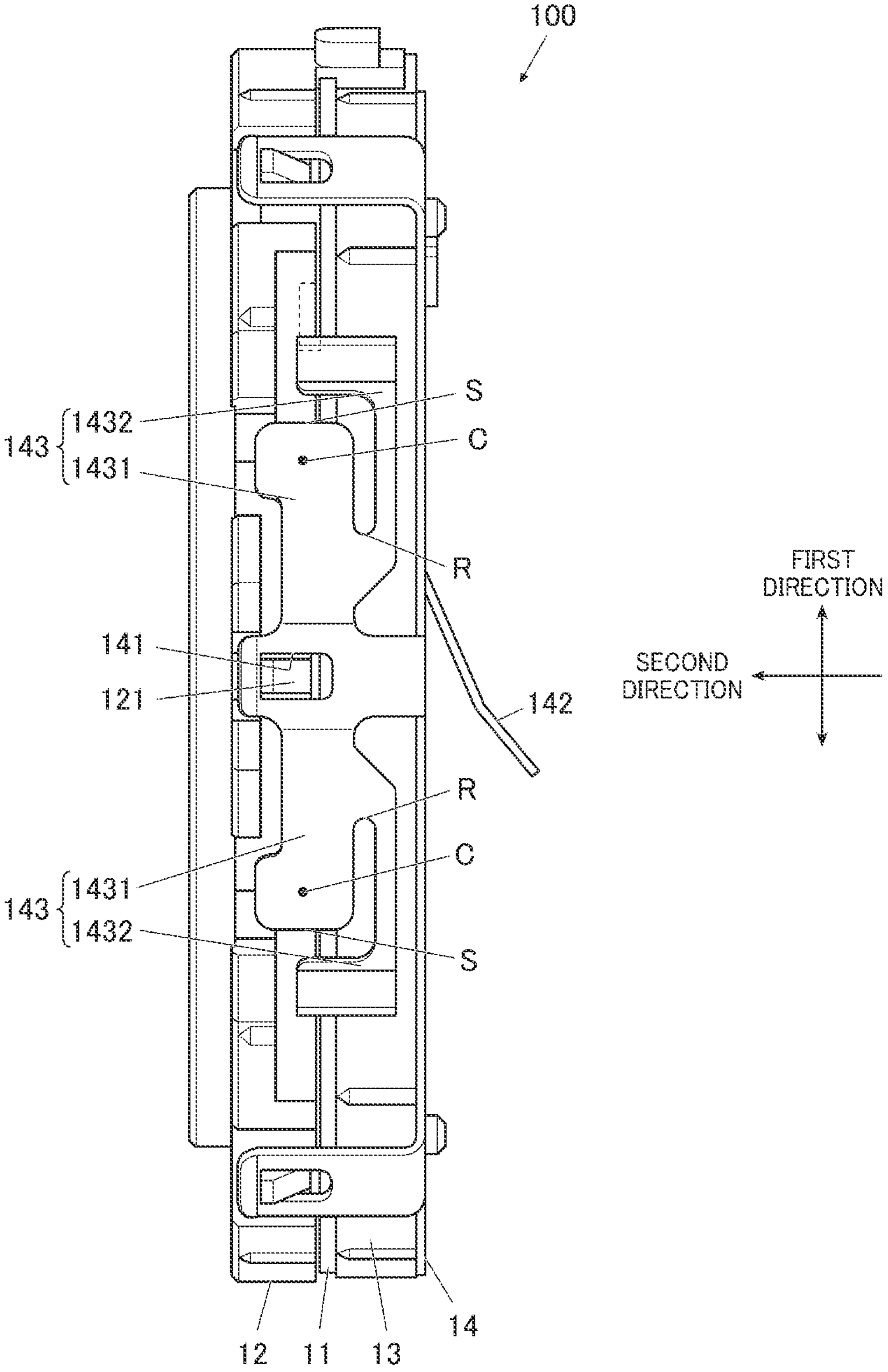
FIG. 2 is a side view of the module including a plate spring.
Figure 3:
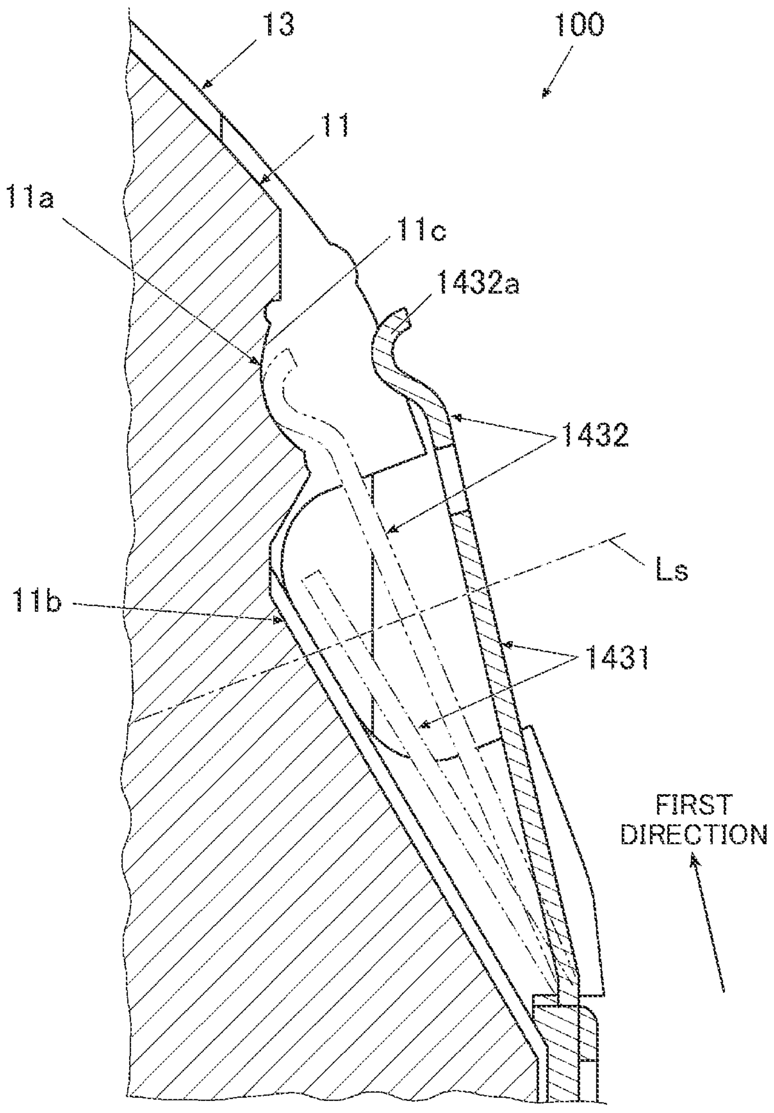
FIG. 3 shows a part of a section taken along a substrate included in the module.

FIG. 2 is a side view of the module 100 including the plate spring 143. FIG. 3 shows a part of a section taken along the substrate 11.

As shown in FIG. 2, the plate spring 143 extending from the opening 141 to both sides have short, straight first plate springs 1431 (shaft plate springs) and second plate springs 1432 (contact plate springs). Each second plate spring 1432 branches off from its corresponding first plate spring 1431 in the extending direction of the first plate spring 1431 (first direction) and extends to a point beyond (i.e., further than) the first plate spring 1431.

A first point C of the first plate spring 1431 near the tip thereof is a point for the shaft of the pushbutton switch to contact/push. When the pushbutton switch is pushed, the pushbutton switch applies force to the first plate spring 1431 at the first point C in the inward direction of the module 100, namely, in the direction perpendicular to the surface of FIG. 2 (sheet surface) toward the deep side.

The second plate spring 1432 branches off from the first plate spring 1431 toward the lower side, namely, the side where the second housing 13 is disposed, and extends parallel to the first plate spring 1431 with a slit in between. The slit is sufficiently narrow within a range in which the opposing parts of the first plate spring 1431 and the second plate spring 1432 do not contact one another. The length of the second plate spring 1432 is longer than the length from the root R of the slit to a second point S as the position of the tip of the first plate spring 1431. That is, the second plate spring 1432 extends to a point beyond the second point S. The second plate spring 1432 widens upward (second direction perpendicular to the first direction) at a point beyond the second point S to overlap the substrate 11 (i.e., to a point where the second plate spring 1432 overlaps the substrate 11) in a plan view (side view) in a push direction in which the pushbutton switch (shaft) is pushed. That is, the second plate spring 1432 is bent near the tip to be an L-shape.

When the first plate spring 1431 is bent toward the inner side of the module 100 by the pushbutton switch being pushed, the second plate spring 1432 is also bent in the same direction at substantially the same angle. In an area that is a part of the lateral surface of the substrate 11 and that the second plate spring 1432 can contact, an electrode 11*c* is exposed as described above. Hence, when the first plate spring 1431 is pushed a certain distance (or more), the second plate spring 1432 contacts the electrode 11*c*. When the second plate spring 1432 contacts the electrode 11*c*, the electrode 11*c* is electrically connected to the case-grounded pressing member 14. The substrate 11 is configured (have a component) to detect the conduction (electrical connection) of the electrode 11*c*, thereby detecting the pushed state of the pushbutton switch.

As the distance from the root R of the slit to the first point C is shorter, the bending deformation of the plate spring 143 is greater even if the push distance that the pushbutton switch is pushed is short, and responsiveness to the pushbutton switch being pushed is higher/greater. However, if the distance from the root R of the slit to the first point C is too short, stress required to produce the deformation increases, and the first plate spring 1431 needs to be made thinner (narrower in the up-down direction). If great stress is applied to the first plate spring 1431 made thinner, the first plate spring 1431 is prone to be irreversibly deformed.

As the ratio of the distance from the root R of the slit to the point where the second plate spring 1432 can contact the electrode 11*c* to the aforementioned distance is larger, the ratio of the amount of the bending deformation of the second plate spring 1432 to the amount of the bending deformation of the first plate spring 1431 is larger. The plate spring 143 can efficiently make the second plate spring 1432 contact the electrode 11*c* within a range of the elastic deformation of the plate spring 143. In this embodiment, as an example, the distance from the root R of the slit to the point where the second plate spring 1432 can contact the electrode 11*c* is at least twice the distance from the root R of the slit to the first point C.

As shown in FIG. 3, the widened tip (tip part) of the second plate spring 1432 has a curved part 1432*a* that is curved toward the inner side of the module 100. The substrate 11 has a recess 11*a* corresponding to the curved part 1432*a*, and the electrode 11*c* is disposed along the recess 11*a*. This expression "corresponding to" does not mean they have the same shape. The recess 11*a* may be slightly larger and/or shallower than the curved part 1432*a* to allow easy entry of the curved part 1432*a*. The shaft of the pushbutton switch pushes the first plate spring 1431 along a dash-dot-dash line Ls. Accordingly, the second plate spring 1432 is bent inward, and the curved part 1432*a* contacts the recess 11*a* as indicated by a dash-dot-dot-dash line.

The lateral surfaces of the substrate 11 and the second housing 13 have, along an area of the first plate spring 1431, a local depression 11*b* that is depressed in the inward direction of the module 100. The depression 11*b* is provided further inside the module 100 as compared with the recess 11*a*. The first housing 12 not shown in FIG. 3 also has, in the lateral surface, the depression 11*b* along the area of the first plate spring 1431. Hence, even when the pushbutton switch is fully pushed, the first plate spring 1431 does not contact any of the substrate 11, the first housing 12 and the second housing 13 as indicated by another dash-dot-dot-dash line. The pushbutton switch being pushed is not limited to being caused by an intentional push operation made by a user. The pushbutton switch being pushed may be caused by a collision of the electronic timepiece against a floor or the like when the electronic timepiece falls.

When the pushbutton switch is pushed suddenly and significantly by an impact due to, for example, a fall of the electronic timepiece, not only the second plate spring 1432 contacts the electrode 11*c*, but also the first plate spring 1431 is further pushed inward by the shaft of the pushbutton switch. At the time, the second plate spring 1432 is distorted between the root R (branching point from the first plate spring 1431) and the curved part 1432*a* according to the positional difference between the first plate spring 1431 and the second plate spring 1432. If the distortion is small, force applied between the curved part 1432*a* of the second plate spring 1432 and the electrode 11*c* (substrate 11) increases. If the distortion is great, the second plate spring 1432 may not be restored to its original state. With these taken into account, the thickness (width) of the first plate spring 1431 in the direction (up-down direction) perpendicular to its extending direction (first direction), the thickness (width) of the second plate spring 1432 in the up-down direction and the ratio of these are appropriately set.

Since the second plate spring 1432 is an L-shape and the tip part is on the extension of the first plate spring 1431, when excessive force is applied to the first plate spring 1431, the area where the second plate spring 1432 contacts the electrode 11*c* becomes large, and great force is hardly applied locally. Even if the first plate spring 1431 is further pushed, the second plate spring 1432 is less likely to be twisted.

Since the second plate spring 1432 is an L-shape and the tip part is on the extension of the first plate spring 1431, the plate spring 143 has a sufficient length although the second plate spring 1432, which is configured to contact the electrode 11*c*, is not lengthened linearly. Hence, the electronic device has high impact resistance.

As described above, the electronic device of this embodiment includes the first plate spring(s) 1431, the second plate spring(s) 1432 and the substrate 11. The first plate spring 1431 extends in the first direction, which is along the lateral surface of the electronic device, from the opening 141 as the fixed end by the claw 121. The second plate spring 1432 branches off from the first plate spring 1431 and extends in the first direction beyond the second point S, which is the position of the tip of the first plate spring 1431 in the first direction. The substrate 11 has the electrode 11*c* that contacts the second plate spring 1432 accompanied by the first plate spring 1431 being pushed by the pushbutton switch being pushed. The substrate 11 does not contact the first plate spring 1431 by the pushbutton switch being pushed. The second plate spring 1432 has the tip part. The tip part extends, at a point beyond the tip (second point S) in the first direction, in the second direction (upward) different from (perpendicular to) the first direction to overlap the substrate 11. The tip part contacts the electrode 11*c* by the pushbutton switch being pushed.

According to this electronic device, no matter whether the pushbutton switch is pushed excessively, the first plate spring 1431 is bent without contacting the substrate 11. Hence, even when the pushbutton switch is pushed excessively by a large impact due to a fall or the like, the electronic device can reduce an impact on the substrate 11 and so forth. Further, since the second plate spring 1432 is not straight but bent and long and can contact the substrate 11 widely, the second plate spring 1432 can disperse an impact. Thus, the electronic device has high impact resistance. It is therefore unnecessary to provide a projection or the like around the pushbutton switch on the exterior member or the like to prevent the pushbutton switch from being pushed suddenly and excessively due to an unintentional fall or the like. Hence, the degree of freedom in designing electronic devices (and electronic timepieces) increases. Further, the electrode 11*c* can contact the second plate spring 1432 no matter where in the second direction the electrode 11*c* is disposed. Hence, the degree of freedom in designing electronic devices increases. Further, since, from the root R of the slit (branching point of the second plate spring 1432), the point where the second plate spring 1432 can contact the electrode 11*c* is further than the first point C, a push operation or the like on the pushbutton switch is efficiently detected within the range of the elastic deformation of the plate spring 143 against a push operation or the like on the pushbutton switch.

Further, the second direction is perpendicular to the first direction. The second plate spring 1432 having the tip part extending in the direction perpendicular to the first direction especially can more stably receive and disperse an impact.

Further, the first plate spring 1431 extends in the first direction, which is along the lateral surface, from the opening 141 to the second point S passing through the first point C for the shaft of the pushbutton switch to contact. The electrode 11*c* contacts and is electrically connected to the second plate spring 1432 accompanied by the first point C of the first plate spring 1431 being pushed a certain distance (predetermined distance) or more by the shaft the pushbutton switch of which is pushed. The substrate 11 does not contact the first plate spring 1431 even by the pushbutton switch being fully pushed. In the plan view, the tip part of the second plate spring 1432 extends, at the point beyond the second point S in the first direction, in the second direction (upward) to overlap the substrate 11.

According to this electronic device, the first plate spring 1431 can absorb an impact by deforming, and the second plate spring 1432 can contact the substrate 11 widely. Hence, the electronic device can more appropriately reduce an impact on the substrate 11, the electronic components and so forth. That is, the electronic device (i.e., plate spring 143) has high impact resistance. Further, the electrode 11*c* can contact the second plate spring 143 no matter where in the second direction the electrode 11*c* is disposed. Hence, the degree of freedom in designing electronic devices increases.

Further, the second plate spring 1432 has, at the tip part, the curved part 1432*a* that is curved toward the electrode 11*c*. The curved part 1432*a* of the second plate spring 1432 contacts the electrode 11*c* by the pushbutton switch being pushed. Since the projecting part contacts the electrode 11*c*, the electronic device can more reliably detect an action of the pushbutton switch, namely, the pushbutton switch being pushed.

Further, the electrode 11*c* is disposed along the recess 11*a* of the substrate 11. The recess 11*a* is curved to correspond to the curved part 1432*a*. Since the electrode 11*c* is shaped to correspond to the curved part 1432*a* of the second plate spring 1432, the electronic device maintains certainty of their contact. That is, the tip part of the second plate spring 1432 is configured to contact the electrode 11*c*. Thus, the contact point on the electrode 11*c* is likely to be the same or similar point stably (always). Further, even when the plate spring 143 receives an excessive impact from the shaft, the second plate spring 1432 (i.e., curved part 1432*a*) is unlikely to be off the recess 11*a*.

Further, the electronic device further includes the first housing 12 and the second housing 13 between which the substrate 11 is interposed. The first plate spring 1431 and the second plate spring 1432 are disposed alongside one another in the stack direction in which the substrate 11, the first housing 12 and the second housing 13 are stacked. The electrode 11*c* is disposed on the lateral surface of the substrate 11. The first housing 12 and the second housing 13 do not contact the first plate spring 1431 even by the pushbutton switch being fully pushed. That is, the first plate spring 1431 does not contact, not only the substrate 11, any part of the module 100 even when the first plate spring 1431 is bent excessively. Hence, the first plate spring 1431 can appropriately disperse an impact received from the push-button switch and reduce occurrence of malfunction or the like of the electronic device.

Further, the substrate 11, the first housing 12 and the second housing 13 have the depression 11*b* that is depressed along a push direction in which the first plate spring 1431 is pushed. The depression 11*b* is provided further inside the module 100 (electronic device) as compared with the recess 11*a*. That is, the depression 11*b* is provided closer to the center of the module 100 (electronic device) than the recess 11*a*. Hence, even when the first plate spring 1431 is pushed excessively as described above, the first plate spring 1431 does not contact any of the substrate 11, the first housing 12 and the second housing 13. Further, since the substrate 11 is not smaller than necessary, an adverse effect of the above on the arrangement of the circuits and the electronic components on the substrate 11 is minimum.

Further, the electronic timepiece of this embodiment includes the electronic device described above. Hence, the electronic timepiece has high resistance to an impact due to a fall or the like.

Further, the electronic timepiece further includes the pushbutton switch having the shaft that pushes the first point C of the first plate spring 1431 by the pushbutton switch being pushed. According to this electronic timepiece, an adverse effect of an impact or the like due to a fall or the like on the pushbutton switch(es) can be reduced while operations on the pushbutton switch(es) can be received.

The above embodiment is not a limitation but an example, and various modifications can be made.

For example, the second plate spring 1432 may not be the one that has gained its length by widening along the lateral surface of the module 100 at a point beyond the second point S, namely, by being an L-shape that is bent at 90 degrees upward. The second plate spring 1432 may a plate spring that has gained its length by being bent at an angle other than 90 degrees from the first direction to extend in the second direction. The bending point may not be only one. For example, the second plate spring 1432 may be a plate spring that is bent not to be an L-shape but a J-shape. The tip of the J-shape may be located on the upper side of the area of the first plate spring 1431 in the side view. That is, the second plate spring 1432 may be a plate spring that is shaped to surround the second point S, which is the tip of the first plate spring 1431, on three sides. As another example, the second plate spring 1432 may a plate spring that curvedly changes its direction at a point beyond the second point S.

Further, the second plate spring 1432 may a plate spring that gradually or stepwise widens upward from a point beyond the second point S. The tip part, which spreads in the up-down direction, may be thicker (wider) at the upper side than at the lower side (side toward which the second plate spring 1432 separates (branches off) from the first plate spring 1431).

In any case, the tip part of the second plate spring 1432 is shaped to wrap the tip of the first plate spring 1431, thereby improving impact resistance of the electronic device and the electronic timepiece.

Further, in the above embodiment, the entire tip part of the second plate spring 1432 is curved to be a U-shape, but not limited thereto. The tip part of the second plate spring 1432 may be another shape to project toward the electrode 11*c*, such as a V-shape or a J-shape. Alternatively, only a portion of the tip part of the second plate spring 1432 to contact the electrode 11*c* may project toward the electrode 11*c*. Still alternatively, the tip part of the second plate spring 1432 may not have a projecting shape.

Further, in the above embodiment, the recess 11*a*, which is provided in the lateral surface of the substrate 11 and where the electrode 11*c* of the substrate 11 is disposed, is curved, but not limited thereto. The recess 11*a* may be box-like or stair-like.

Further, in the above embodiment, the substrate 11, the first housing 12 and the second housing 13 have the depression 11*b* not to contact the first plate spring 1431, but not limited thereto. For example, if cutting their originally protruding projections or apexes can make the substrate 11, the first housing 12 and the second housing 13 not contact the first plate spring 1431, they are cut but unnecessary to be recessed/depressed.

Further, in the above embodiment, the substrate 11 is interposed between the first housing 12 and the second housing 13. In this configuration, the substrate 11, which is situated in the middle, and the first plate spring 1431 are likely to overlap one another in the side view. Hence, the tip part of the second plate spring 1432 of this embodiment can appropriately make the second plate spring 1432 and the electrode 11*c*, which is on the lateral surface of the substrate 11, contact one another accompanied by the first plate spring 1431 being pushed. However, the electronic device is not limited to this configuration. The substrate 11 may not be interposed between the first housing 12 and the second housing 13, or a plate-like/layer-like component(s) may be stacked in addition to the substrate 11, the first housing 12 and the second housing 13.

Further, in the above embodiment, the pushbutton switches are disposed on the lateral surface of the electronic timepiece, but not limited thereto. The pushbutton switches may be disposed on the front surface (upper surface/side) and/or the bottom surface (lower surface/side) thereof. Further, the pushbutton switches are not particularly limited in shape.

Further, in the above embodiment, the electronic device is a module of an electronic wristwatch, but not limited thereto. The electronic device may be a module of a portable electronic timepiece or the like that is not worn on an arm/wrist. Alternatively, the electronic device may be a module of an electronic product that is worn or carried by a user, such as a smartwatch, an activity measuring device or a vital sign measuring device.

The specific configurations, components, structures and positional relationships described in the above embodiment can be modified appropriately without departing from the scope of the present disclosure. The scope of the present disclosure includes the scope of claims and the scope of their equivalents.

The invention claimed is:

1. An electronic device comprising:

a first plate spring extending in a first direction from a fixed end;

a second plate spring branching off from the first plate spring and extending in the first direction beyond a tip of the first plate spring in the first direction; and a substrate having an electrode that contacts the second plate spring accompanied by the first plate spring being pushed by a pushbutton switch being pushed, the substrate not contacting the first plate spring by the pushbutton switch being pushed, wherein the second plate spring has a tip part that in a plan view in a push direction in which the pushbutton switch is pushed, extends, at a point beyond the tip of the first plate spring in the first direction, in a second direction different from the first direction to overlap the substrate, wherein the tip part contacts the electrode by the pushbutton switch being pushed, wherein the substrate has a depression that is depressed along a push direction in which the first plate spring is pushed, and wherein the first plate spring is disposed in the depression and does not contact the substrate in a state in which the first plate spring is pushed.

2. The electronic device according to claim 1, wherein the second direction is perpendicular to the first direction.

3. The electronic device according to claim 1, wherein the first plate spring extends in the first direction from the fixed end to a second point passing through a first point for a shaft of the pushbutton switch to contact, and wherein the electrode contacts and is electrically connected to the second plate spring accompanied by the first point of the first plate spring being pushed a certain distance or more by the shaft the pushbutton switch of which is pushed.

4. The electronic device according to claim 2, wherein the first plate spring extends in the first direction from the fixed end to a second point passing through a first point for a shaft of the pushbutton switch to contact, and wherein the electrode contacts and is electrically connected to the second plate spring accompanied by the first point of the first plate spring being pushed a certain distance or more by the shaft the pushbutton switch of which is pushed.

5. The electronic device according to claim 3, wherein the substrate does not contact the first plate spring even by the pushbutton switch being fully pushed, and wherein in the plan view in the push direction in which the shaft of the pushbutton switch is pushed, the tip part of the second plate spring extends, at the point beyond the second point in the first direction, in the second direction to overlap the substrate.

6. The electronic device according to claim 4, wherein the substrate does not contact the first plate spring even by the pushbutton switch being fully pushed, and wherein in the plan view in the push direction in which the shaft of the pushbutton switch is pushed, the tip part of the second plate spring extends, at the point beyond the second point in the first direction, in the second direction to overlap the substrate.

7. The electronic device according to claim 1, wherein the second plate spring has, at the tip part, a curved part that is curved toward the electrode and contacts the electrode by the pushbutton switch being pushed.

8. The electronic device according to claim 2, wherein the second plate spring has, at the tip part, a curved part that is curved toward the electrode and contacts the electrode by the pushbutton switch being pushed.

9. The electronic device according to claim 3, wherein the second plate spring has, at the tip part, a curved part that is curved toward the electrode and contacts the electrode by the pushbutton switch being pushed.

10. The electronic device according to claim 4, wherein the second plate spring has, at the tip part, a curved part that is curved toward the electrode and contacts the electrode by the pushbutton switch being pushed.

11. The electronic device according to claim 7, wherein the substrate has a recess that is curved to correspond to the curved part, and wherein the electrode is curved to correspond to the recess of the substrate and disposed along the recess.

12. The electronic device according to claim 8, wherein the substrate has a recess that is curved to correspond to the curved part, and wherein the electrode is curved to correspond to the recess of the substrate and disposed along the recess.

13. The electronic device according to claim 11, further comprising support members between which the substrate is interposed, wherein the first plate spring and the second plate spring are disposed alongside one another in a stack direction in which the substrate and the support members are stacked, wherein the electrode is disposed on a lateral surface of the substrate, and wherein the support members do not contact the first plate spring.

14. The electronic device according to claim 12, further comprising support members between which the substrate is interposed, wherein the first plate spring and the second plate spring are disposed alongside one another in a stack direction in which the substrate and the support members are stacked, wherein the electrode is disposed on a lateral surface of the substrate, and wherein the support members do not contact the first plate spring.

15. The electronic device according to claim 13, wherein the depression is provided further inside the electronic device as compared with the recess.

16. The electronic device according to claim 14, wherein the depression is provided further inside the electronic device as compared with the recess.

17. An electronic timepiece comprising the electronic device according to claim 1.

18. The electronic timepiece according to claim 17, further comprising the pushbutton switch having the shaft that pushes the first point of the first plate spring by the pushbutton switch being pushed.

19. The electronic device according to claim 1, wherein in a state in which the first plate spring is not pushed, the second plate spring extends parallel to the first plate spring on a plane perpendicular to the push direction in which the first plate spring is pushed.

20. The electronic device according to claim 1, wherein in a state in which the second plate spring contacts the electrode, a distance in the push direction between the depression and the first plate spring is shorter than a distance in the push direction between the depression and the second plate spring.

* * * * *